Figure 1:
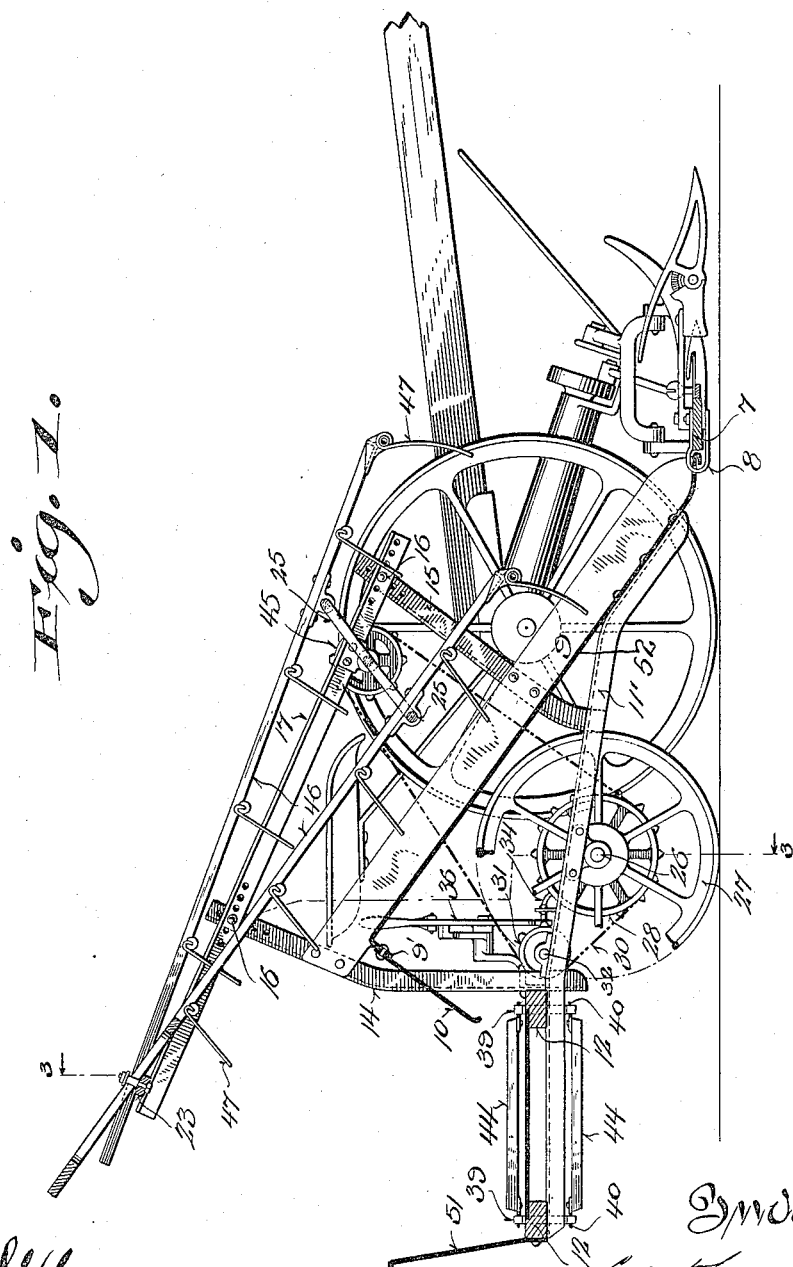

L. FRANZMEIER.
MOWER ATTACHMENT.
APPLICATION FILED APR. 6, 1915.

1,168,384.

Patented Jan. 18, 1916.
3 SHEETS—SHEET 1.

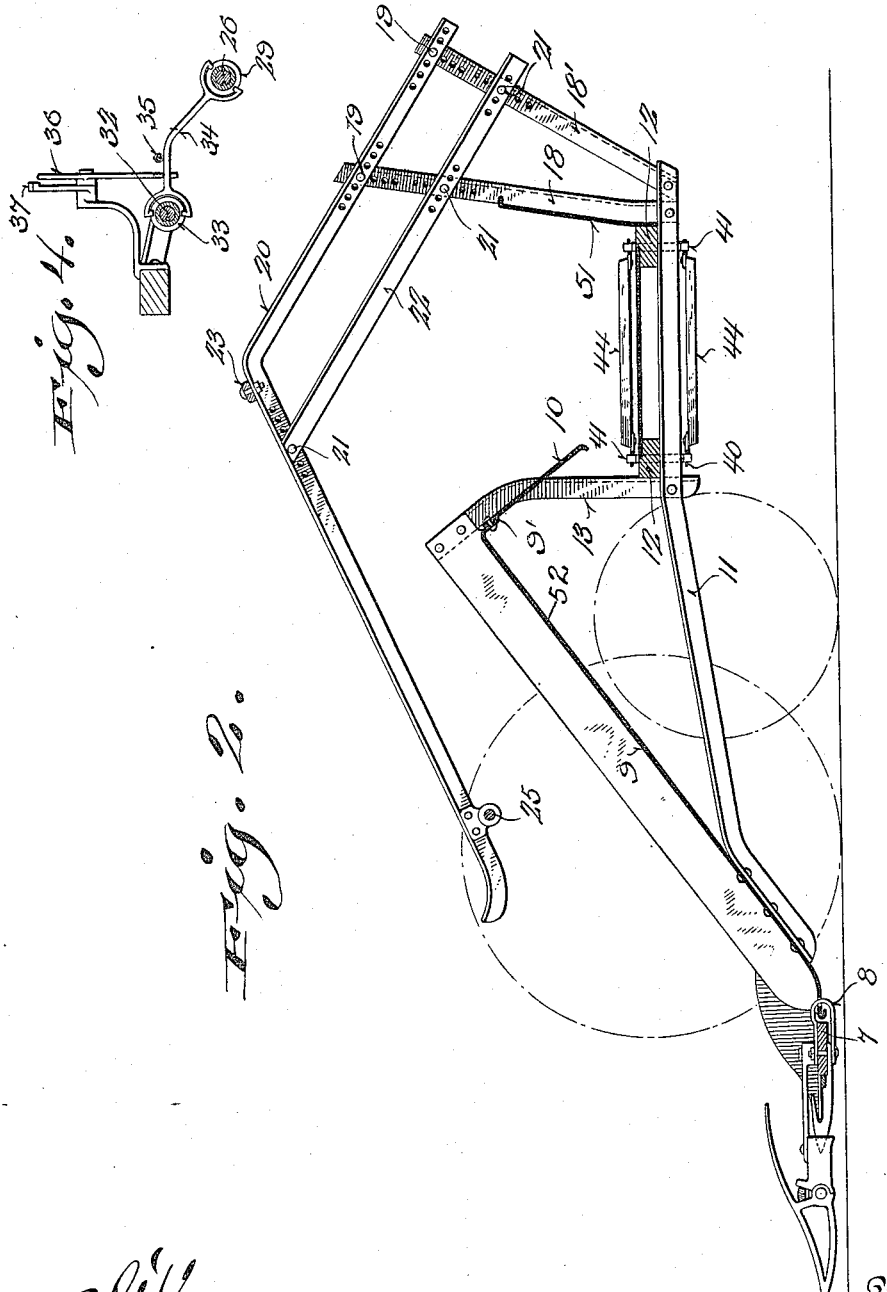

L. FRANZMEIER.
MOWER ATTACHMENT.
APPLICATION FILED APR. 6, 1915.
1,168,384.
Patented Jan. 18, 1916.
3 SHEETS—SHEET 3.
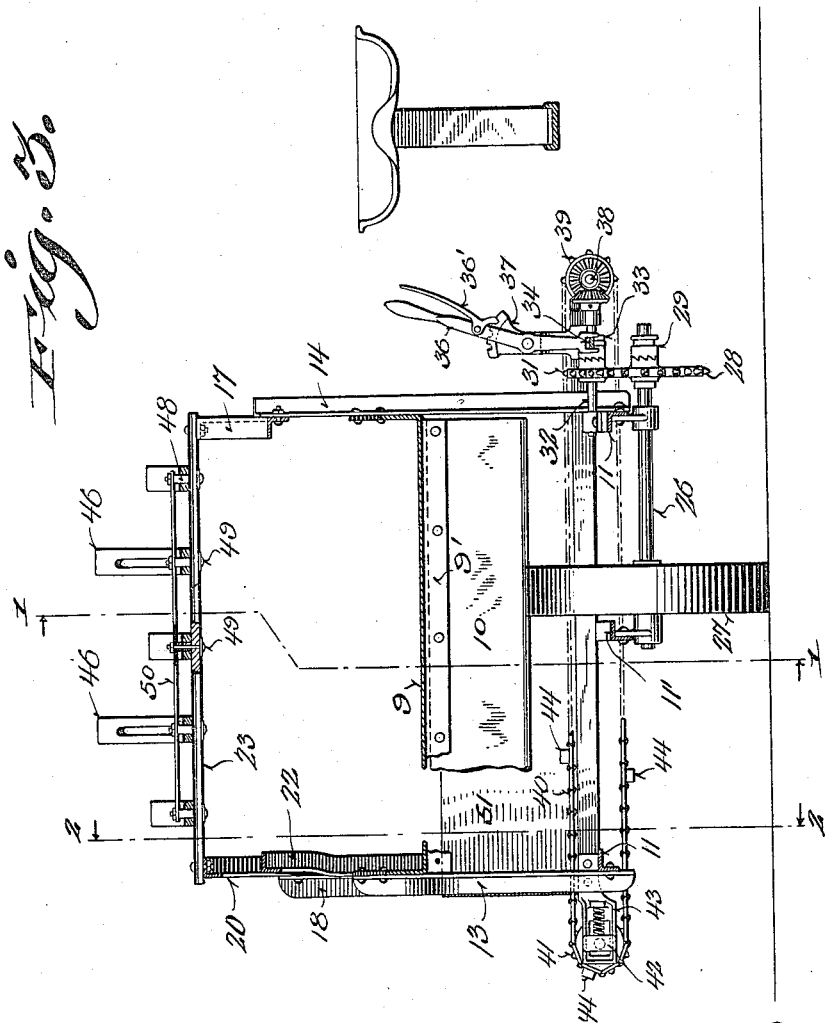

UNITED STATES PATENT OFFICE.

LOUIS FRANZMEIER, OF NEWTON, WISCONSIN.

MOWER ATTACHMENT.

1,168,384.

Specification of Letters Patent. Patented Jan. 18, 1916.

Application filed April 6, 1915. Serial No. 19,447.

*To all whom it may concern:*

Be it known that I, LOUIS FRANZMEIER, a citizen of the United States, and resident of Newton, in the county of Manitowoc and State of Wisconsin, have invented certain new and useful Improvements in Mower Attachments; and I do hereby declare that the following is a full, clear, and exact description thereof.

My invention consists in what is herein particularly set forth with reference to the accompanying drawings and pointed out in the claims of this specification, and like in my Letters Patent No. 973,421, of October 18, 1910, its object is to provide simple, economical and efficient side-delivery mower attachments by which to facilitate harvesting of pea-vines, clover and other vegetation of various kinds, the improved attachment involving tedder-mechanism for elevating cut material in an inclined trough back of the cutting-mechanism of a mower.

Figure 1 of the drawings represents a vertical longitudinal section view of my improved attachment applied to the finger-bar of a mower to extend in rear of the same, the view being indicated by line 1—1 in Fig. 3; Fig. 2, a similar section view indicated by line 2—2 in Fig. 3; Fig. 3, a cross-section view indicated by line 3—3 in Fig. 1 and Fig. 4, a partly sectional side elevation of a fragment of the attachment.

Referring by numeral to the drawings, 7 indicates the finger-bar of an ordinary mower and bolted thereto are clevis-clips 8 engaging apertures provided in the lower end of a preferably sheet-metal inclined trough 9 having a depending rear flange 9' to which a slide 10 is suitably attached. The trough is fastened upon the lower portions of suitably bent rearwardly extending angle-iron bars 11, 11', and beams 12 are fastened to the horizontal rear portions of said bars at right-angles to the same. Rigid on the bars 11, adjacent to the foremost of the beams 12, are angle-iron standards 13, 14, to which the sides of the trough 9 are fastened. The standard 14, attached to the innermost side bar 11 extends above the trough, and another standard 15, in connection with the same side bar is also extended above the trough to which it is fastened. The upper end of each standard 14, 15, is provided with a series of vertically disposed bolt-holes, as is clearly shown in Fig. 1. Bolts 16 are employed to fasten an angle-iron bar 17 to the standards 14, 15, in vertically adjusted position, and said bar is provided with series of bolt-holes, as also shown in Fig. 1, to permit of its longitudinal adjustment in either direction with respect to said standards.

Fastened to the rear end of the bar 11 farthest from the gearing aforesaid are standards 18, 18', each provided at its upper end with a series of vertically disposed bolt-holes, shown in Fig. 2, and fastened to the same standards, by bolts 19, is a suitably bent angle-iron bar 20 provided with series of bolt-holes to permit of its longitudinal adjustment in either direction with respect to said standards. Held in connection with the standards 18, 18', and bar 20, by bolts 21 is a brace 22 provided with series of bolt-holes to provide for its longitudinal adjustment with said bar that is of itself provided with a series of bolt-holes to provide for adjustable arrangement of one of the bolts 21.

Bolted on the bars 17 and 20 is a rear cross-brace 23, and hung in bearings 24 depending from the same bars is a crank-shaft 25. The several bars, beams, standards and braces specified constitute the frame of my improved mower-attachment, and fastened to the bars 11 are bearings for a shaft 26 that serves for an axle of a traction-wheel 27. Fast on the shaft is a sprocket-wheel 28, the hub of which is made to constitute the fixed member of a clutch, and the adjustable member 29 of the clutch is splined on said shaft. A link-belt 30 is trained on the sprocket-wheel 28 and on a similar wheel 31 that is fast on a spindle 32 for which the frame aforesaid is provided with bearings, the hub of the wheel 31 being made to constitute the fixed member of a clutch having the adjustable member 33 thereof splined on said spindle. Spanner-ends of a yoke 34 engage annular grooves in the adjustable members 29, 33, of the respective clutches, and a spring, indicated at 35 in Figs. 1 and 4, connects the yoke with an adjacent frame-bar the same as in the letters patent to which reference is had in the foregoing. A lever 36 in connection with the yoke 33 is fulcrumed on a stud of a rack-bracket 37 attached to said frame, and the lever is provided with a latch 36' for locking it to said bracket in adjusted position.

In miter-gear connection with the spindle 32 is an arbor 38 for which the frame aforesaid is provided with bearings, and a pair of sprocket-wheels are fast on the arbor, the same as in the aforesaid Letters Patent, one of these wheels being shown at 39 in Fig. 3. A link-belt 40 of an endless side-delivery conveyer is trained on each sprocket-wheel 39 and a similar wheel 41 fast on a bearing-stud of a spring-controlled slide-block 42 guided in a bracket 43 that extends laterally from one of the bars 11 to which it is fastened, said conveyer being composed of the two link-belts and lugs 44 attached thereto, the same as in the Letters Patent aforesaid. The upper stretch of the conveyer slides on the beams 12 aforesaid and is thus prevented from sagging.

The link-belt 30 is trained on a sprocket-wheel 45 fast on the crank-shaft 25 and the cranks of said shaft are coupled to longitudinally slotted bars 46. Provided in connection with each of the bars 46 at intervals longitudinally of the same are spring-tines 47, said bars and tines constituting tedders reciprocative over the trough 9. The slot of each of the tedder-bars is engaged by an antifriction guide roller 48 on a bolt 49 extending through the brace 23, and the several bolts extend through a tie-plate 50 opposing bolt-engaging nuts. The rear upper cross-brace 23, and the movement of the tedders with respect to the trough 9 is regulated by adjustment of the frame bars 17, 20, on the standards to which they are secured, the brace 22 being adjusted with the bar 20.

By having the standards and brace for the support of the bar 20 back of the trough 9 there is nothing to obstruct the elevation of overhanging cut material in said trough at that side of the machine, said cut material being elevated by means of the tedders. The elevated material finds its way from the trough 9 down the slide 10 onto the conveyer above specified, and a rear upwardly extending shield 51 is provided in connection with a frame-beam 12 to prevent said material from falling off said conveyer. Another shield 52 is arranged to prevent material falling through the conveyer, the same as in the previously noted Letters Patent.

When the lever 36 is in the position shown in Fig. 3, the adjustable clutch-members 29 and 33 are in engagement with the hubs of the sprocket-wheels 28 and 31 respectively to effect a continuous operation of the tedders and the conveyer aforesaid, the result being a lifting of the cut material in the trough 9 and a discharge of the same onto said conveyer from which it has side delivery to form a window, but the organization of my improved mower-attachment is such that the clutch-member 33 may be disengaged from the hub of the sprocket-wheel 31 ahead of the disengagement of the clutch-member 29 from the hub of the sprocket-wheel 28 to thereby stop the conveyer without disturbing the action of the tedders so that cut material may be accumulated on said conveyer and discharged therefrom at a later time. By intermittent stopping and starting of the conveyer provision is had for delivery of the cut material in bunches at varying distances apart instead of windrowing said material, and by a proper adjustment of the lever 36, said conveyer and tedder mechanisms may be stopped, one after the other, at practically the same instant whenever necessary or desirable on the part of the operator.

I claim:

1. A mower comprising a wheeled support, and a frame for supporting tedders and the like thereon including standards, longitudinal members having connections with the standards that permit vertical and longitudinal adjustments of said longitudinal members relative to the standards, and a horizontal member connecting the longitudinal members.

2. A mower attachment comprising a wheeled support, and a support for tedders and the like mounted thereon and forming a frame that includes standards carried by the wheeled support, longitudinally extending side members having connections with the standards that permit said members to be adjusted vertically and longitudinally relatively to the standards, a connecting member for the longitudinal members, and braces having connections with the standards and longitudinal members that permit vertical and longitudinal adjustments of said braces.

3. The combination of a frame, comprising a pair of suitably bent side bars, a pair of beams supported on horizontal rear portions of said bars, a standard in connection with each of the side bars adjacent to the foremost beam, an inclined trough in detachable connection with the finger-bar of a mower and supported at the rear by said standards, another trough-supporting standard in connection with the inner side bar, both of the standards with said inner side bar being extended above the trough; an upper bar in vertically and longitudinally adjustable connection with the upwardly extending trough-supporting standards, a pair of upwardly divergent standards in connection with the outer side bar in rear of said beams, another upper bar and a brace for the same in vertically and longitudinally adjustable connection with said divergent standards, a rear cross-brace on the upper bars, a crank-shaft for which said upper bars are provided with bearings, tedder bars coupled to the cranks of said shaft and guided on said cross-brace, an endless horizontal side-delivery conveyer the upper stretch of which travels on the aforesaid beams to receive cut tedder elevated material discharged from said trough, a traction-wheel having its axles in bearings with which the frame is provided, and clutch-controlled conveyer and tedder drive-gear in train with said axle.

In testimony that I claim the foregoing I have hereunto set my hand at Manitowoc, in the county of Manitowoc and State of Wisconsin, in the presence of two witnesses.

LOUIS FRANZMEIER.

Witnesses:
  Jos. ZAHORIK,
  Jos. M. ZAHORIK.

Copies of this patent may be obtained for five cents each, by addressing the "Commissioner of Patents, Washington, D. C."